No. 778,120. PATENTED DEC. 20, 1904.
T. B. DIXON.
MULTIPLEX TELEGRAPHY.
APPLICATION FILED OCT. 11, 1898. RENEWED MAY 16, 1904.
NO MODEL. 6 SHEETS—SHEET 1.

Fig. 1.

WITNESSES
INVENTOR
Thomas B. Dixon
BY
ATTORNEYS

No. 778,120. PATENTED DEC. 20, 1904.
T. B. DIXON.
MULTIPLEX TELEGRAPHY.
APPLICATION FILED OCT. 11, 1898. RENEWED MAY 16, 1904.
NO MODEL. 6 SHEETS—SHEET 3.

Fig. 3.

WITNESSES
INVENTOR
Thomas B. Dixon
BY
ATTORNEYS

No. 778,120. PATENTED DEC. 20, 1904.
T. B. DIXON.
MULTIPLEX TELEGRAPHY.
APPLICATION FILED OCT. 11, 1898. RENEWED MAY 16, 1904.
NO MODEL. 6 SHEETS—SHEET 4.

Fig. 4.

WITNESSES: INVENTOR
Thomas B. Dixon
BY
ATTORNEYS

No. 778,120. PATENTED DEC. 20, 1904.
T. B. DIXON.
MULTIPLEX TELEGRAPHY.
APPLICATION FILED OCT. 11, 1898. RENEWED MAY 16, 1904.
NO MODEL. 6 SHEETS—SHEET 5.

WITNESSES: INVENTOR
Thomas B. Dixon
BY
ATTORNEYS

No. 778,120.  Patented December 20, 1904.

UNITED STATES PATENT OFFICE.

THOMAS B. DIXON, OF NEW YORK, N. Y.

MULTIPLEX TELEGRAPHY.

SPECIFICATION forming part of Letters Patent No. 778,120, dated December 20, 1904.

Application filed October 11, 1898. Renewed May 16, 1904. Serial No. 208,091.

*To all whom it may concern:*

Be it known that I, THOMAS B. DIXON, a citizen of the United States, residing at New York, in the county of New York and State of New York, have invented certain new and useful Improvements in Multiplex Telegraphy; and I do hereby declare the following to be a full, clear, and exact description of the invention, such as will enable others skilled in the art to which it appertains to make and use the same.

My invention relates generally to signaling systems and to instruments employed therein, and particularly to improvements in systems of multiplex telegraphy whereby a plurality of distinct and separate messages may be transmitted simultaneously over a single wire or conductor or over a submarine cable.

My invention resides in the novel combination and arrangement of circuits and instruments employed and in the novel construction of those instruments.

The objects of my invention are, first, to improve multiplex signaling systems, and particularly multiplex systems of telegraphy, and render it possible to operate such multiplex systems over longer lines and with greater rapidity than has been practicable with former systems, to avoid all interference between the messages transmitted, and to avoid interference with the transmission due to leakage, mutilation of signals, induction, and similar disturbing causes; second, to render it practicable to transmit two messages simultaneously in the same direction and an equal number of messages in the opposite direction over long submarine cable-lines, which cannot be done with the systems of multiplex telegraphy now in use on such lines, and, third, to make the system as simple as possible and to perfect the instruments required. These objects are attained in the system of signaling particularly adapted for telegraphic signaling herein described, and illustrated in the drawings which accompany and form a part of this specification, in which the same reference letters and numerals indicate the same or corresponding parts, and in which—

Fig. 5 also illustrates a slightly-different form of transmitter from that shown in the preceding figures.

In the diplex and quadruplex telegraph systems herein described all of the signals are transmitted by pulsatory currents, each signal being transmitted by two pulses, one at the beginning and the other at the end of the signal. One transmitter at each end of the line produces positive pulses only in the line, the other transmitter producing only negative pulses. The two receiving-relays which respond to said transmitters are operated one by positive pulses only and the other by negative pulses only, each relay being changed from and restored to normal condition by alternate pulses of that plurality by which said relay may be operated. Interference with the operation of the receiving instruments at one end of the line by the currents produced by the operation of the transmitting instruments at the same end of the line is prevented by any of the ordinary methods of duplex telegraphy.

Figure 1:
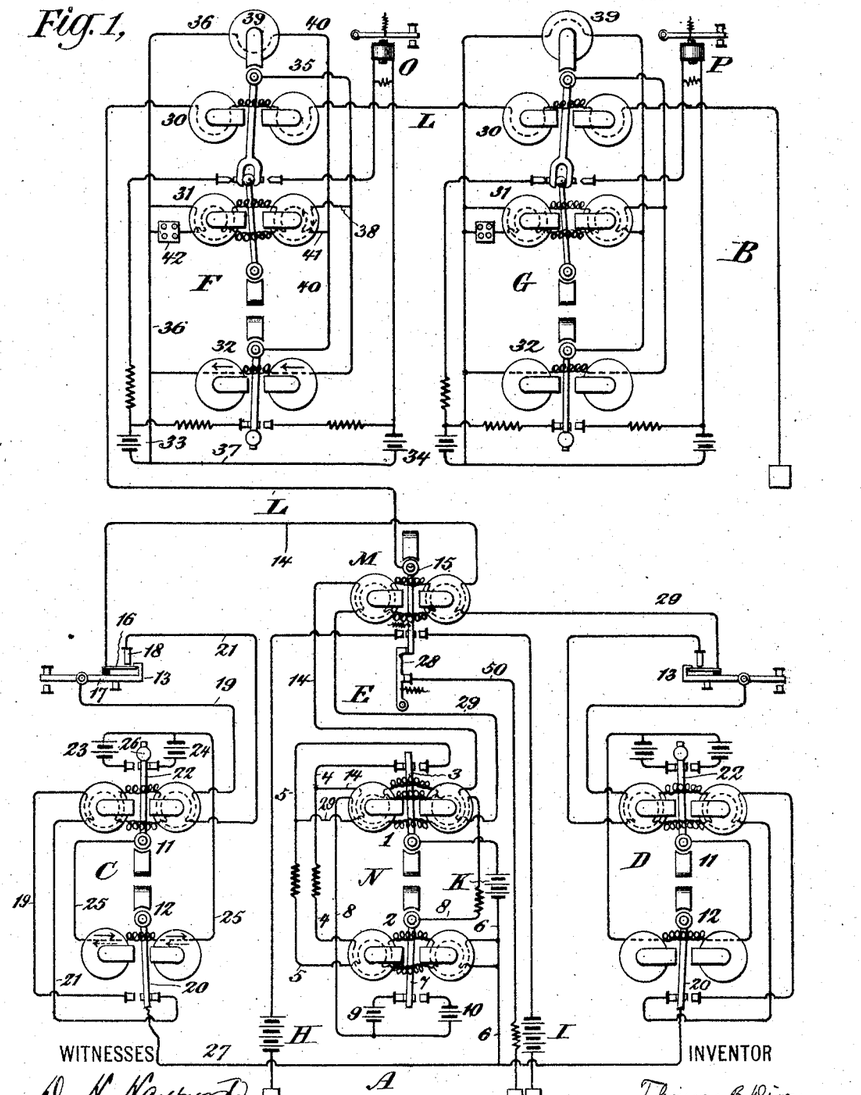
Figure 1 is a diagram illustrating the arrangement of circuits and instruments for transmitting two simultaneous messages over a single line conductor in one direction, the receiving instruments illustrated being of the type which is especially intended for use on land-lines.

Referring now to the drawings and first of all to Fig. 1, which illustrates the arrangement of circuits and instruments for diplex telegraphy over land-lines and short submarine cable-lines, A is a transmitting-station, and B a receiving-station, at opposite ends of a line-wire L.

C and D are transmitting instruments, and E a selecting instrument at the transmitting end of the line, and F and G are receiving-relays at the receiving end of the line.

H and I are line batteries or generators oppositely connected to the line, so as to furnish thereto currents of opposite direction, and K a local battery or generator of the transmitting-station which supplies current for circuits connecting the selector E and the transmitting instruments C and D.

Other batteries at the transmitting-station are local to the instruments to which they are connected and will be mentioned hereinafter.

The function of transmitter C is to place battery H to the line for an instant at the beginning and again at the end of each signal sent through that transmitter, and similarly the function of transmitter D is to place battery I to the line momentarily at the beginning and again at the end of each signal sent through that transmitter. Since both batteries may not be connected with the line simultaneously without each neutralizing the effect produced by the other, the selector E is employed to give precedence automatically to one battery, placing the other battery to the line as soon as the pulse from the battery having precedence is completed. The selector consists of a main or selecting relay M and a vibrator N, itself composed of two polar relays 1 and 2, which alternately reverse each other, thus producing exceedingly-rapid vibration of their armatures.

The circuits of or controlled by selector E are as follows: The positive pole of battery K is connected to the armature 3 of relay 1. To the two contact-stops of this armature are connected the local-circuit conductors 4 and 5, leading to opposing magnet-coils of relay 2 and thence to a return-conductor 6, leading to the negative pole of battery K. The one circuit or the other is complete, according to with which contact-stop the armature 3 makes contact at any instant. To the armature 7 of relay 2 is connected the local-circuit conductor 8, connected to one set of coils of relay 1 and thence to batteries 9 and 10, oppositely placed, which are connected each to one of the contact-stops of armature 7. Circuit 4 when complete tends to move armature 7 to the left, so as to complete circuit 8 through battery 9, and circuit 8 when completed through battery 9 tends to move the armature 3 of relay 1 to the right, so completing circuit 5. Circuit 5 when complete tends to move armature 7 to the right, so completing circuit 8 through battery 10, and since battery 10 is placed oppositely to battery 9 the completion of circuit 8 through battery 10 tends to deflect the armature 3 to the left again. When two polar relays are connected together in this manner, each reversing the other, their armatures vibrate with great rapidity, particularly if the armatures be light and their stops adjusted so as to permit only a small amplitude of movement. Such a vibrator is preferable for use in my system to vibrators consisting of spring-reeds electrically driven, because when either armature is in either of its extreme positions no tendency exists for it to move to the opposite position until the polarity of its magnets has been reversed, and if such reversal of the magnets of one of the relays be prevented at any instant—as, for instance, by energizing other coils of that relay which exert a preponderating influence on the armature—the vibration of the armatures ceases instantly, to be resumed instantly when the circuit exerting such preponderating influence is broken; but I do not limit myself to the use of this type of vibrator.

Transmitters C and D are exactly similar in construction and the circuits by which they are connected to selector E are similar. Only transmitter C need be described. It consists of polar rays 11 and 12, a hand-key 13, and suitable circuits now to be described.

From conductor 4 a branch conductor 14 leads through coils of relays 1 and M to a contact-tongue of hand-key 13, forming a part of transmitter C. The coils of relays 1 and M, through which this circuit 14 passes, are so wound that when energized the armature 3 of relay 1 is held to the left and the armature 15 of relay M is moved to the left. The coils of relay 1, through which circuit 14 passes, exert a stronger influence upon the armature 3 when energized than do the coils through which circuit 8 passes. This is indicated in the drawings by showing the battery K as made up of a greater number of cells than batteries 9 and 10.

Key 13 has contact-points similar to the contact-points of an ordinary continuity-preserving transmitting-relay—that is to say, it has a spring contact-tongue 16 mounted upon a movable lever 17, having a contact point or hook adapted to make contact with the tongue, and a stationary contact-point 18, adapted to make contact with the contact-tongue when the key is depressed and to move the tongue away from the contact-hook.

To the lever 17 of key 13 is connected a conductor 19, leading through coils of relay 11 to the left-hand contact-stop of relay 12. Normally conductors 14 and 19 are in communication, their circuit being broken at relay 12, the armature 20 of said relay being in contact with its right-hand contact-point.

To the contact-point 18 of key 13 is connected a conductor 21, leading through coils of relay 11, which oppose those coils to which conductor 19 is connected, to the right-hand contact-point of relay 12.

To the contact-stops of the armature 22 of relay 11 are connected batteries or generators 23 and 24, the poles of which are oppositely placed, both of these batteries being connected to a conductor 25, leading through coils of relay 12 to the armature 22. When circuit 25 is complete through battery 24, it tends to move the armature 20 to the right and to hold it in that position, and when complete through battery 23 said circuit tends to move the armature 20 to the left and to hold it in that position. Relay 12 is very quick-acting, having a very light armature, while relay 11 is slower acting, its armature having upon it a weight 26, by moving which along the armature the speed of the relay may be adjusted.

When key 13 is depressed, its contacts 16 and 18 make contact, and if the armature 3 be then in contact with its left-hand contact-stop circuit 14 is completed through conductor 21, armature 20, and a return-conductor 27, connected to return-conductor 6, which leads to the negative pole of battery K. If armature 3 be not in contact with its left-hand contact-stop at the very instant when contact is made between contacts 16 and 18 of key 13, it will be in contact therewith an instant thereafter, since it is in rapid vibration. As soon as circuit 14 is complete armatures 3 and 7 stop vibrating, because the current of battery K in the coils of relay 1, which are included in circuit 14, exerts a greater influence on armature 3 than is exerted upon said armature by the current of battery 10 in circuit 8, and the armature 15 of relay M moves to the left, as does the armature 22 of relay 11. As soon as armature 22 reaches its left-hand contact-stop it completes circuit 25 through battery 23, thus reversing relay 12 and breaking circuit 14. Armatures 3 and 7 of relays 1 and 2 then commence vibrating again. When key 13 is released, contact-tongue 16 and contact-hook 17 make contact, completing circuit 14 through conductor 19, armature 20, and return-conductors 27 and 6 if or as soon as armature 3 is in contact with its left-hand contact-stop, and the armature 22 of relay 11 is deflected to the right, circuit 14 remaining complete, however, until armature 22 has reached its right-hand contact-stop and by completing circuit 25 through battery 24 has reversed relay 12.

The armature 15 of relay M has a spring which tends to draw it to the left; but it is held in central position normally against the tension of said spring by a continuity-preserving contact-lever 28, having a stronger spring. A contact-stop of said lever 28 prevents it from moving the armature 15 beyond the central position. When circuit 14 is completed, (as it is for an instant when key 13 is depressed and again when key 13 is released, as shown above,) armature 15 is moved to the left until it makes contact with its left-hand contact-point, to be returned to central position as soon as circuit 14 is broken. To the left-hand contact-stop of armature 15 is connected the positive pole of line-battery H, and to the armature itself is connected the line conductor L. When key 13 is depressed and again when key 13 is released, therefore, battery H is placed to the line momentarily, so producing in the line a momentary current pulsation of positive polarity.

A conductor 29, branching from conductor 5, passes through magnet-coils of relays 1 and M, these coils being wound, however, so as to hold armature 3 and deflect armature 15 to the right when energized, and said conductor is connected to the contact-tongue of the key 13 of transmitter D. When said key 13 is depressed and again when it is released, the armature of relay M is moved to the right, and since the right-hand contact-stop of said relay is connected to the negative pole of line-battery I said battery is placed to the line momentarily when the key is depressed and again when it is released, so producing in the line a momentary current pulsation of negative polarity.

Both batteries H and I may not be placed to the line simultaneously, however, because should both keys 13 be depressed at the same instant the selector E will give precedence to the pulse from one battery, causing it to be placed to the line before the other battery is so placed and holding back the pulse from the second battery until the pulse from the first battery is completed. Which of the two batteries is thus given precedence depends upon whether the armature 3 of relay 1 of the selector makes contact with its right-hand stop or with its left-hand stop the instant after the keys are depressed. With whichever stop it first makes contact it is held in contact therewith until the pulse from the corresponding battery H or I is completed—that is to say, until the armature 22 of the relay 11 of the corresponding transmitter has reversed the relay 12 of that transmitter. As soon as one pulse has been completed, so that the armature 3 is released, it moves to the opposite contact-stop, and so permits the pulsations of current from the other battery to pass through the line.

If one transmitting-key be depressed after the other transmitting-key has been depressed and after the line-battery controlled thereby has been placed to the line, the placing to the line of that line-battery which corresponds to the transmitting-key last depressed will be delayed until the battery corresponding to the transmitting-key first depressed has been cut out of the line by the operation of its transmitter.

The length of the current pulsations produced by the operation of the transmitters is so brief as compared with the length of a "dot" of the telegraphic code that the slight delay in the production of a pulsation from one of the batteries, due to the selecting action of the selector E, above described, does not produce any appreciable or detrimental delay in the operation of the corresponding receiving instrument at the distant end of the line, nor does it appreciably or detrimentally shorten the signal, whether it be a dot or a dash.

The function of relays 11 and 12 of the transmitters is simply to so operate the circuits connected to the corresponding transmitting-key 13 that a pulsation of current of the proper polarity will be produced in the line at the instant when the key is depressed and again at the instant when the key is released; but I do not limit myself to the use of the particular devices for producing double pulses each time a key is depressed and then released, nor do I limit myself to the particular selecting device employed for giving precedence to one or the other of the pulses when two keys are operated simultaneously, although I believe the transmitting instruments and the selector to be particularly suitable for use in this system.

The relays 11 may be termed "primary relays" of the transmitters and the relays 12 "secondary relays." The circuits of which conductors 14 and 29 form parts are controlling-circuits of the selector and may also be called the "selector-circuits" of the transmitters.

The use of two batteries in the circuits controlled by relay 2 of the selector and relays 11 of the transmitters is simply a convenient means of reversing the currents in those circuits. Instead of employing two batteries one or the other of which is in circuit according to the position of the armature any other convenient means for reversing the action of a relay may be employed.

The receiving-relays F and G at the receiving-station B may be termed "single-direction double current relays," since each responds to current impulses of but one direction, but is changed from and restored to normal condition by alternate current impulses of that direction. Each of the relays consists, essentially, of a polar relay provided with means for reversing the polarity of its armature when the position of said armature is reversed, so that a current impulse of the same direction as the impulse which first deflected the armature from its normal position will send it back to normal position; but in order to obtain great delicacy of operation and also steadiness I prefer to employ in the relay the principles employed in the polar relay covered by my Patent No. 560,313, dated May 19, 1896—that is to say, to employ a secondary circuit, which tends to hold the armature stationary, but is broken when the armature moves and is reversed when the position of the armature is reversed, and a tertiary circuit, which normally opposes the secondary circuit, but is weaker than the secondary circuit and is reversed by a reversing-relay controlled by said secondary circuit when the position of the main armature is reversed.

Each receiving-relay consists of three sub-relays—viz., a main relay 30, through which the line-circuit passes, a secondary relay 31, and a reversing-relay 32. The armatures of relays 30 and 31 are mechanically connected, so as to move together, and may be connected in the manner shown diagrammatically, one having a rounded end fitting within a forked end of the other, though I do not limit myself to their connection in this manner. Relay 32 is an ordinary polar relay, having, however, a weighted armature, the weight being adjustable, as is the case with the relays 11 of the transmitters. Each receiving-relay has two local batteries 33 and 34, the poles of which are oppositely placed. The positive pole of battery 33 is connected to the left-hand contact-stop of the connected armatures of relays 30 and 31 and is also connected to the left-hand contact-stop of relay 32. The negative pole of battery 34 is similarly connected to the right-hand contact-stop of relay 32 and to the right-hand contact-stop of relays 30 and 31 through a sounder or other receiving instrument, which is lettered O for receiving-relay F and P for receiving-relay G. Preferably a shunt resistance-coil is connected across the terminals of each sounder, as shown in the drawings. One of the two connected armatures of relays 30 and 31 is connected to a conductor 35, leading through coils of relay 32 to a return-conductor 36, connected to a conductor 37, which connects the negative pole of battery 33 and the positive pole of battery 34. When battery 33 energizes this circuit of conductor 35, the armature of relay 32 is moved or held to the left, and when battery 34 energizes the circuit said armature is moved or held to the right. A branch conductor 38 leads from conductor 35 through coils of relay 31 to return-conductor 36, and these coils of relay 31 when energized by battery 33 tend to hold the two connected armatures to the left, while when the coils are energized by battery 34 they tend to hold the connected armatures to the right.

Relays 31 and 32 have their armatures magnetized by permanent magnets, or if their armatures be magnetized by electromagnets the polarity of such magnets is never changed with respect to that of the main or "field" magnets. The armature of relay 30, however, is magnetized by an electromagnet 39, the polarity of which is reversed by the relay 32 when it operates, owing to the fact that relay 39 is energized by current from whichever of the batteries 33 or 34 is in communication with the armature of relay 32 and passing from said armature through conductor 40, which is also connected to the coils of magnet 39, and through the return-conductor 36. A branch conductor 41 leads from conductor 40 through coils of relay 31, which oppose those to which conductor 38 is connected, and through an adjusting-rheostat 42 to the return-conductor 36. The resistance of the rheostat 42 is so adjusted that the effect upon the connected armatures of the coils to which conductor 38 is connected when said coils are energized is almost neutralized by the effect on said armatures of the coils to which conductor 41 is connected, sufficient of the magnetizing force of the coils connected to conductor 38 being left unneutralized, however, to hold the armatures stationary against the effects of leakage or induction currents in the line. The line conductor L passes through the coils of the main magnet of subrelay 30 of relay F and through the corresponding coils of subrelay 30 of relay G to ground.

Conductors 35 and 38, passing through magnet-coils of subrelays 31 and 32, together with the conductors connecting the batteries 33 and 34 to the contact-points of the connected relays 30 and 31 and the return-conductors, may be said to constitute a secondary circuit. Conductors 40 and 41, passing through magnet-coils of relay 31 and through the armature-magnet 39 of relay 30, together with the conductors connecting the batteries 33 and 34 to the contact-points of relay 32 and the return-conductors, may be said to constitute a tertiary circuit.

As will be shown, each of the relays F and G responds only to currents of one polarity, being extremely sensitive, however, to currents of that polarity, so that it may be operated by exceedingly brief pulsatory currents. The polarity of the currents to which each relay will respond is determined by the polarity of its magnet 39, and these magnets of the two relays F and G are oppositely wound or oppositely connected to the conductors 40 and 36, so as to be magnetized oppositely.

The operation of relays F and G may now be understood. It is not necessary to explain the operation of both, as they operate similarly. The magnet 39 of relay F is so wound or so connected in its circuit that said relay responds only to positive pulses—that is to say, to the pulses produced by the operation of transmitter C. The armatures of the relays are shown in their normal position. When a positive pulse comes over the line at the beginning of a signal, it energizes the main magnet of relay 30 of transmitter F and with the aid of the tertiary circuit in relay 31 overcomes the effect of the secondary circuit in relay 31, deflecting the connected armatures to the right. The instant the armatures begin to move the secondary circuit is broken, and the effect of the tertiary circuit on the armatures being then unopposed the current in said tertiary circuit will carry the armatures over, even though the current pulsation in the line which primarily caused the armatures to move should cease before they have reached the right-hand contact-stop. As soon as the armatures reach such stop the secondary circuit is completed from battery 34 through sounder O, thus operating the sounder, holding the connected armatures against their right-hand contact-stop, and reversing relay 32, so reversing the tertiary circuit, which when reversed again opposes the secondary circuit in relay 31. The reversal of relay 32 reverses the polarity of magnet 39, so that when a second positive pulse comes over the line the connected armatures of relays 30 and 31 will be moved to the left and relay 32 again reversed, thus cutting out the sounder O and restoring the parts to their first positions.

When the parts of relay F are in their normal positions, negative pulses in the line tend merely to hold the connected armatures of its relays 30 and 31 to the left, and when said armatures are against their right-hand stop the polarity of magnet 39 having been reversed negative pulses in the line conductor simply tend to hold the armatures in that position.

To the contact-stop of the contact-lever 28 of selecting-relay M is connected a conductor 50, leading to ground. When the armature 15 of said relay occupies an intermediate position, the line conductor L is connected through the armature and lever 28 to conductor 50, and so to ground. This ground connection facilitates the discharge of the line after each signal.

The operation of the instruments and circuits shown in Fig. 1 is as follows: Normally the armatures of relays 1 and 2 of vibrator N are in rapid vibration. If one of the transmitter-keys—as, for instance, that of transmitter C—be depressed, a selector-circuit is completed through conductor 14 in this case and through conductor 21 of the transmitter, thus deflecting the armature of selecting-relay M to the left and placing battery H to the line and arresting the vibration of armatures 3 and 7 of the vibrator. Energizing the magnet-coils of relay 11, through which conductor 21 passes, causes the armature of said relay to move to the left, and when it has reached its left-hand contact-point it completes the local circuit of conductor 25 through battery 23, thus reversing the relay 12, breaking the selector-circuit of conductor 14, and ending the current impulse from battery H, the vibrator beginning to operate again immediately. When the transmitter-key is released, selector-circuit 14 is again completed, this time through conductor 19, the battery H is again placed to the line by relay M, and the relay 11 is again reversed, thus reversing relay 12 and breaking the selector-circuit again, thus ending the current impulse from battery H. In this way a brief current impulse is produced in the line at the beginning and again at the end of each signal of transmitter C, the length of the impulse being determined by the adjustment of the weight on the armature of relay 11 and the distance between the stops of said armature. If transmitter D be operated, an impulse of current from battery I passes through the line at the beginning and again at the end of each signal of the transmitter. Both selector-circuits— viz., the circuits of conductors 14 and 29— cannot be complete at the same instant, for said circuits pass through opposing contacts of relay 1. Hence if the transmitter-keys of the two transmitters be operated simultaneously that selector-circuit will be completed first with the contact-point of which the armature 3 first makes contact, and as each impulse in each selector-circuit checks the vibration of the armature 3 the impulse in the other selector-circuit will be delayed until the impulse in the selector-circuit first completed is finished. In this way conflict between the two transmitters is avoided. The impulses are of such short duration, however, that the slight delay in the sending of an impulse by one transmitter under such circumstances is imperceptible, and the delay is never sufficient to convert a dot into a dash. When an impulse of positive current passes through the line at the beginning of a signal of transmitter C, it deflects the connected armatures of relays 30 and 31 of receiving instrument F to the right. The secondary circuit through conductor 38 is broken the instant said armatures begin to move, so that the tertiary circuit will carry the armatures over, even should the impulse cease before the armatures have reached their right-hand contact-point. When they do reach said right-hand contact-point, the secondary circuit is again completed, but with the current reversed, and the reversing-relay 32 is reversed, thus reversing the direction of current in the tertiary circuit and reversing the magnet 39, by which the armature of relay 30 is magnetized. Negative impulses in the line can have no influence on relay F when the parts are in this position, therefore; but when a succeeding positive pulse passes through the line the armatures are deflected back to their first positions by a similar action of the circuits, magnet 39 recovering its former polarity. The completion of the secondary circuit through the right-hand contact-point of relays 30 and 31 operates the sounder O. Receiving-relay G is operated in a similar manner by negative current impulses, but does not respond to positive current impulses.

The receiving-relays are not affected by leakage and induction currents in the line, since a line-current in order to operate either relay must overcome, though but for an instant, that portion of the influence of the secondary circuit on the armatures of relays 30 and 31 which is not balanced by the tertiary circuit.

Figure 2:
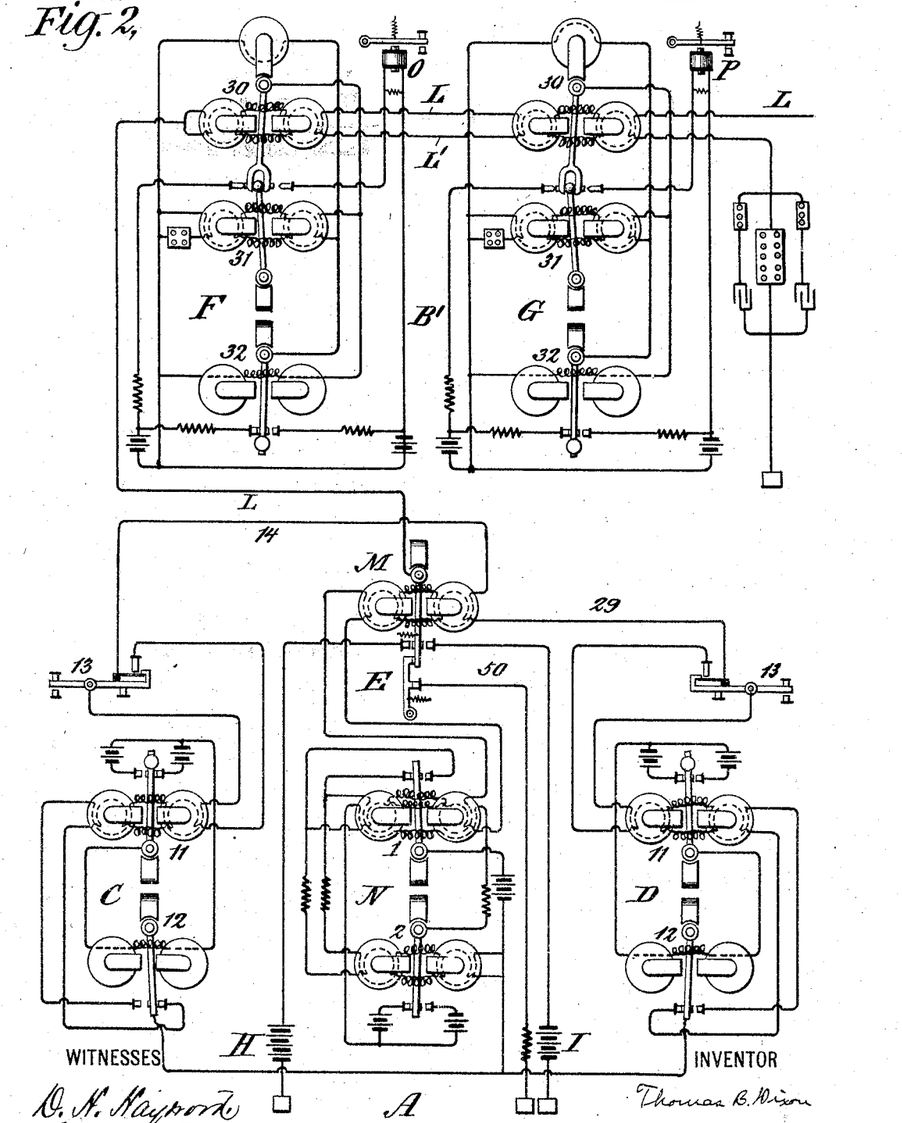
Fig. 2 is a diagram illustrating the arrangement of circuits and transmitting and receiving instruments at one end of a quadruplex line, the arrangement of circuits and transmitting and receiving instruments being similar to those shown in Fig. 1.

In Fig. 2 the transmitting and receiving instruments at one end of a quadruplex line are shown. The transmitting instruments and circuits are the same as those shown in Fig. 1. Since the receiving-station corresponds to a transmitting-station at the distant end of the line, it is lettered B'. The receiving instruments are the same as those shown in Fig. 1, except that each main relay is provided with two separate sets of coils, one connected to the line conductor L and the other to an artificial-line conductor L'. The effect of the artificial line is to balance the influence of outgoing messages in the line upon the home receiving instruments.

Figure 3:
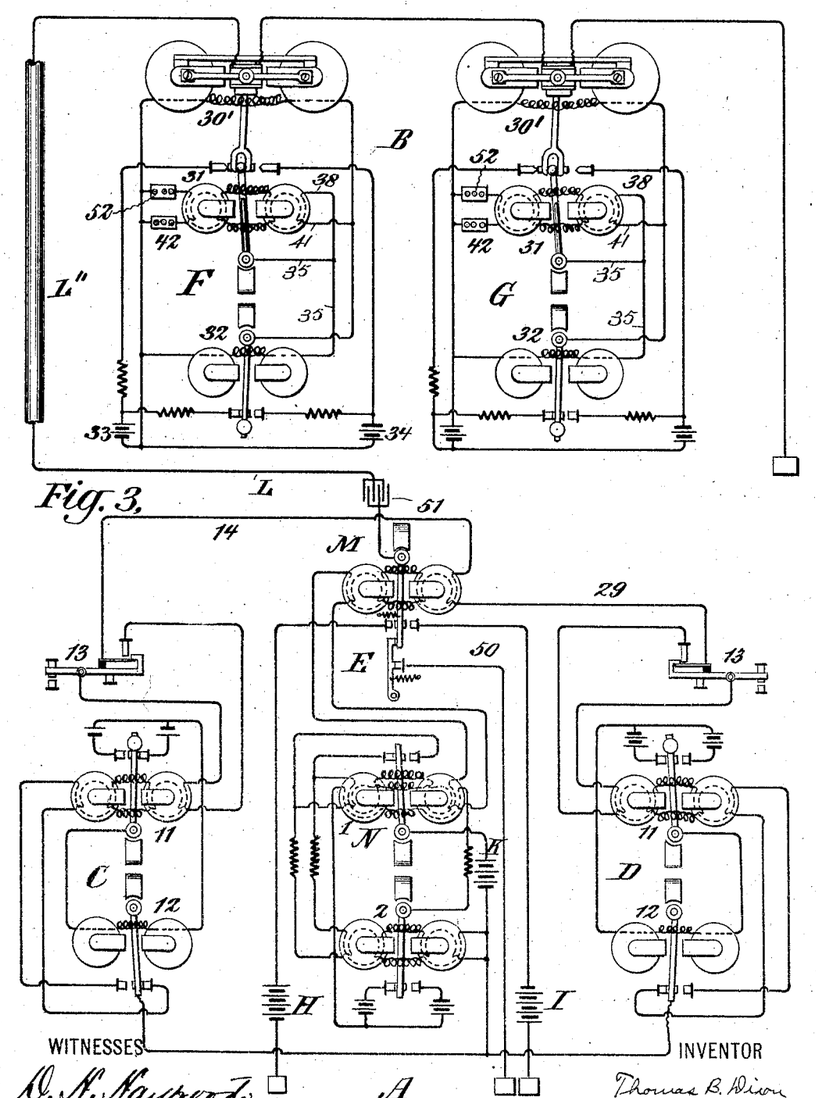
Fig. 3 is a view similar to Fig. 1, illustrating, however, receiving instruments particularly intended for use on submarine cable-lines.

In Fig. 3 the circuits and instruments for diplex cable working are shown. The transmitting instruments are the same as those shown in Figs. 1 and 2. The selecting-relay M is connected to the line, however, through a condenser 51. The portion of the line conductor indicated by the letter L'' indicates a submarine cable. The receiving-relays are substantially the same as those shown in Figs. 1 and 2, but differ slightly in details which particularly adapt them for working with weak currents. The armatures of relays 30', corresponding to relays 30 of Figs. 1 and 2, are helices, through which the line-circuit passes, located between the poles of powerful field-magnets which are in the tertiary circuit. This construction is one commonly employed in submarine-cable instruments. The reversal of the polarity of the field-magnets, the armatures being magnetized by the line-current, has the same effect as the reversal of the polarity of the armature in the construction shown in Fig. 1, in which the field-magnets are magnetized by the line-current. In both cases the relative polarity of the armature and field-magnets is reversed. The secondary-circuit conductor 38 is provided with a rheostat 52, so that the influence of the secondary circuit on the armature of relay 31 may be adjusted. Inasmuch as in cable-working no interference from induction or leakage currents is experienced, the influence of the secondary circuit may be less than that of the tertiary circuit, and this is desirable in order that the effect of the permanent magnetism in the armature may be neutralized to as great an extent as is consistent with steadiness of operation, thus adapting the relays for working with very faint and brief currents. The connected armatures are then held to the one side or the other simply by their permanent magnetism produced by the solenoid of relay 30', and this permanent magnetism is counterbalanced by the unbalanced effect of the magnetism induced in relay 31 by the tertiary circuit. By properly adjusting the resistance of rheostat 52 the effect of the magnetism of the connected armatures may be so balanced that the slightest current in the primary or line circuit in the proper direction will cause the deflection of the armatures.

Figure 4:
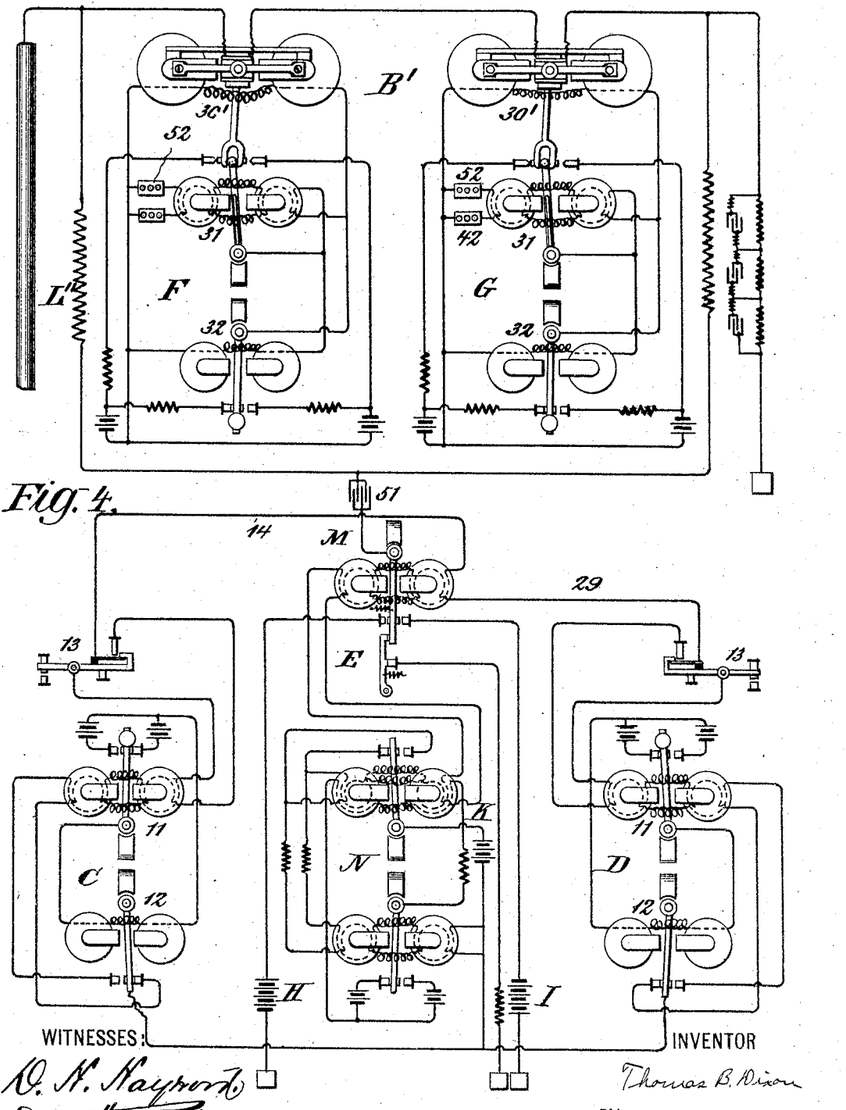
Fig. 4 is a diagram illustrating the arrangement of circuits and transmitting and receiving instruments at one end of a submarine cable-line, the arrangement of circuits and instruments and the receiving instruments being similar to those illustrated in Fig. 3.

Fig. 4 shows the circuits and instruments at one end of a quadruplex cable-line. The circuits and instruments are similar to those shown in Fig. 3, the receiving-relays being duplexed according to the well-known Wheatstone bridge method.

The receiving-relays in Figs. 3 and 4 may operate siphon recording mechanism in the ordinary manner or may operate reflecting-mirrors or even sounders.

Figure 5:
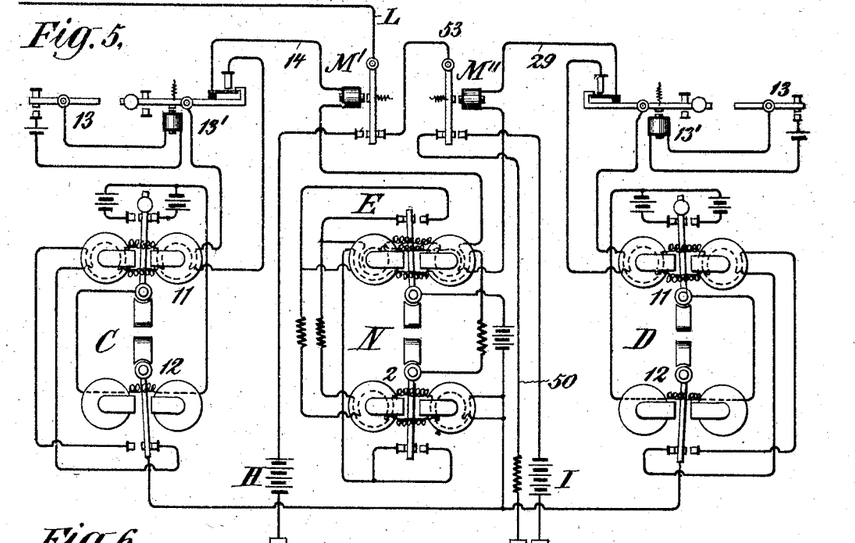
Figs. 5 and 6 illustrate the use of selectors differing somewhat in construction from the selector shown in Figs. 1 to 4, inclusive.

Fig. 5 illustrates a selector slightly different from those shown in the preceding figures. The vibrator N is not changed in construction; but instead of employing a single selecting-relay M two separate relays M' and M'' of a type which operates more rapidly than the relay M shown in the preceding figures are employed. Each of these selecting-relays is controlled by but one of the selector-circuits, M' being in the circuit controlled by transmitter C and M'' being in the circuit controlled by transmitter D. Batteries H and I are connected to the front contact-stops of relays M' and M'', respectively. The line conductor L is connected to the armature of relay M', and from the rear contact-stop of said relay a conductor 53, forming normally a continuation of the line conductor, leads to the armature of relay M''. The front contact-stop of relay M'' is connected to the battery I, the rear contact-stop to the discharge-conductor 50, leading to ground. When the circuit through conductor 14 is completed, the armature of relay M' is attracted and battery H placed to the line, the connection of the conductor 53 to the line being broken, and when the circuit of conductor 29 is completed the armature of relay M'' is attracted and battery I placed to the line.

In Fig. 5 the contact-points by which the selector-circuits are operated are not placed upon the keys 13, but upon ordinary transmitting-relays 13', operated by local circuits controlled by keys 13. The same arrangement may be adopted in all of the figures, if preferred. It is used to insure regularity in the operation of the transmitters. The time of movement of the armatures of relays 13' may be adjusted by movable weights on the armature-levers.

Figure 6:
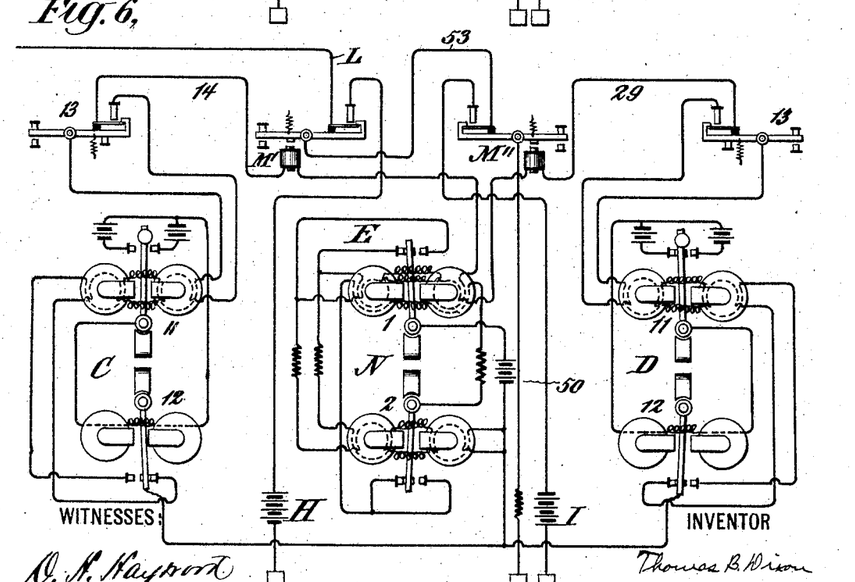

Fig. 6 shows another form of selector, in which also two selecting-relays M' and M'', each controlled by one of the selector-circuits of the transmitters, are employed; but the selector-relays are of the type commonly used for transmitter-relays having continuity-preserving contact-points. The line conductor is connected to the contact-tongue of relay M', and from the armature-lever of M' the conductor 53 leads to the contact-tongue of relay M''. To the stationary contact-point of each transmitter is connected the line-battery controlled by that transmitter. The discharge-conductor is connected to the armature of relay M''. The operation of these relays is similar to that of relays M' and M'' in Fig. 5.

Figure 7:
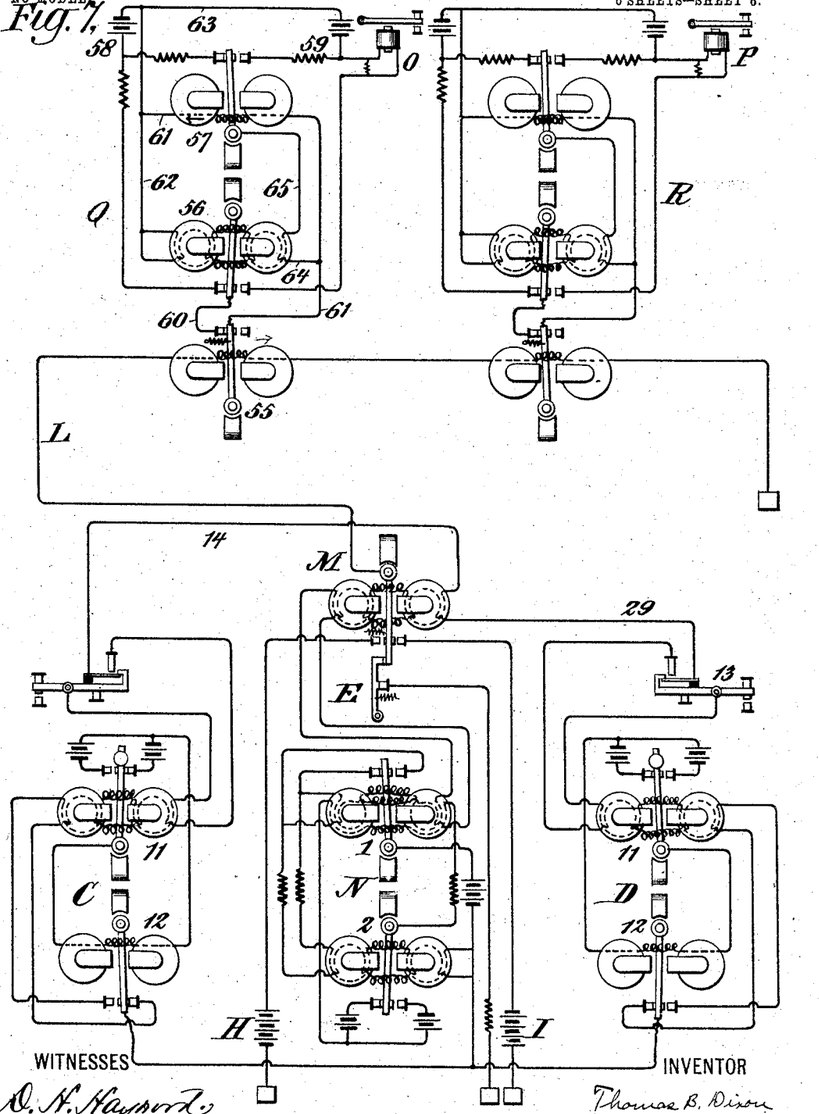
Fig. 7 is a view similar to Fig. 1, illustrating, however, a different form of receiving-relay from that shown in the preceding figures.

In Fig. 7 the transmitters, selector, and circuits are the same as in Fig. 1, but the receiving-relays are of a different type from those shown in Fig. 1, although they are single-direction double-current relays. They are lettered Q and R. They are similar in construction and but one, Q, need be described. Relay Q consists of three subrelays and connecting-circuits. Of these subrelays 55 is the actuating-relay. In construction it is a polar-relay, but has an armature-spring which normally holds its armature to one side, so that it may be operated by currents of but one direction—say, for instance, positive currents. An impulse or positive current will cause the armature to move to the right, but as soon as such current ceases the armature will return to normal position. The other subrelays, 56 and 57, are polar-relays of ordinary type. There are two batteries, 58 and 59, oppositely placed, so that the direction of current in the circuits of the instruments may be reversed by simply changing from one battery to the other instead of employing current-reversing contact-points or equivalent means for reversing the relays. Battery 58 is connected to the left-hand contact-points of relays 56 and 57, and battery 59 is similarly connected to the right-hand contact-points of said relays. A conductor 60 connects the armature of relay 56 with the front contact-point of relay 55, and a conductor 61 connects the armature of relay 55 to magnet-coils of relay 57, and thence to a return-conductor 62, leading to a return-conductor 63 common to the batteries. A branch 64 from conductor 61 passes through magnet-coils of relay 56 to the return-conductor 62. Conductors 60, 61, and 64, with the return-conductors, constitute a secondary circuit, the primary circuit of the instrument being the line-circuit. A conductor 65 connects the armature of relay 57 with magnet-coils of relay 56 and thence with the return-conductor 62. This circuit constitutes a tertiary circuit. The secondary and tertiary circuits are so connected to the magnet-coils of relay 56 that currents from the same battery passing through said circuits oppose each other. The secondary circuit when connected to battery 58 tends to hold the armatures of relays 56 and 57 to the left. When an impulse of positive current passes through the line, the armature of relay 55 kicks to the right for an instant until said impulse ceases. The movement of the armature interrupts the secondary circuit, and the tertiary circuit immediately moves the armature of relay 56 to the right. When the armature of relay 55 returns to normal position and again completes the secondary circuit, said circuit is connected to battery 59 instead of battery 58 by reason of the reversal of relay 56. Relay 57 is therefore reversed as soon as the secondary circuit is completed, thus reversing the direction of current in the tertiary circuit. When a second impulse of positive current passes through the line and the armature of relay 55 is deflected to the right again, interrupting the secondary circuit, the tertiary circuit causes the armature of relay 56 to move to the left again, and as soon as said secondary circuit is again completed the armature of relay 57 is moved to the left, thus reversing the direction of current in the tertiary circuit and restoring the circuits to the condition existing before the relay 55 first operated. A sounder to be operated by the instrument is placed in the circuit of battery 59. The actuating subrelay of relay R is arranged to respond only to currents of negative direction. Otherwise relay R is the same in construction as relay Q. When relays Q and R are employed in quadruplex systems, their actuating-relays may by provided with magnet-coils for both line and artificial-line circuits.

A great advantage of the system of duplex and quadruplex telegraphy herein described is that it employs nothing but pulsatory currents. I have found that much better results may be obtained by the use of such currents than by the use of currents of longer duration. Arcing at the contact-points is avoided, and it is possible to use a higher line-potential without excessive leakage than would be possible otherwise, thus insuring clearer signals. Another great advantage of this system is that it employs nothing but polar instruments, which are far more sensitive, quick-acting, and reliable than instruments of the neutral type.

For convenience in following the action of opposing magnet-coils of certain of the instruments herein illustrated I have sought in certain instances—as, for example, in the illustration of relay 1—to indicate the opposing action of the several coils in each magnet-spool of the relay by showing the same wound in opposite directions about the core. It will be understood that such illustration is purely diagrammatic and illustrative and does not indicate any specific direction of winding. Furthermore, it has been necessary to avoid confusion of the drawings to show corresponding coils on opposite sides of the armatures of the said relays as wound in the same direction. It will be understood that in so doing I illustrate merely the relative winding with respect to each core, considered separately of the coils surrounding the same, and that the connection of the several corresponding coils to their respective circuits must nevertheless be such that corresponding coils on opposite sides of an armature tend in every case to produce opposite magnetic poles, as in any ordinary relay or horseshoe-electromagnet.

In another application for Letters Patent, filed April 22, 1902, Serial No. 104,154, being a division of this application, I have claimed the method of transmission above described and carried out by the apparatus herein described.

Having thus completely described my invention, what I claim, and desire to secure by Letters Patent, is—

1. In a telegraph system, the combination, with a line conductor, means for supplying current to the line, and a double-current-transmitting instrument and means operated thereby for producing in the line a current impulse at the beginning and again at the end of each signal of the transmitter, both impulses having the same direction, of a single-direction double-current-receiving instrument adapted to be changed from, and restored to, normal condition by alternate current impulses of the direction of the impulses produced by the operation of said transmitter, substantially as described.

2. In a telegraph system, the combination, with a line conductor, means for supplying to the line currents of two different directions, two double-current-transmitting instruments, one for each direction of line-current, and a selector, of two single-direction double-current-receiving instruments, one operated only by positive currents, and the other only by negative currents, and each adapted to be changed from, and restored to, normal condition, by alternate current impulses of proper direction in the line, substantially as described.

3. In a telegraph system, the combination, with a line conductor, means for supplying to the line currents of two different directions, two double-pulsatory-current-transmitting instruments, one for each direction of line-current, and a selector, of two single-direction double-current-receiving instruments, one operated only by positive currents, and the other only by negative currents, and each adapted to be changed from, and restored to, normal condition, by alternate current impulses of proper direction in the line, substantially as described.

4. In a telegraph system, the combination, with a line conductor, means for supplying current to the line, at each end thereof, and a double-current-transmitting instrument at each end of the line and means operated thereby for producing in the line a current impulse at the beginning and again at the end of each signal of that transmitter, of a single-direction double-current-receiving instrument at each end of the line adapted to be changed from, and restored to, normal condition, by alternate current impulses of the direction of the impulses produced by the operation of the transmitter at the distant end of the line, and means for counteracting, at each end of the line, the effect of the outgoing messages upon the receiving instrument located at that end of the line, substantially as described.

5. In a telegraph system, the combination, with a line conductor, means for supplying to the line, at each end thereof, currents of two different directions, two double-current-transmitting instruments, at each end of the line, one for positive and the other for negative currents, and a selector at each end of the line, of two single-direction double-current-receiving instruments at each end of the line, one operated only by positive currents and the other only by negative currents, and each adapted to be changed from, and restored to, normal condition, by alternate current impulses of proper direction in the line, and means for counteracting, at each end of the line, the effect of the outgoing messages upon the receiving instruments located at that end of the line, substantially as described.

6. In a telegraph system, the combination, with a line conductor, means for supplying to the line, at each end thereof, currents of two different directions, two double-pulsatory-current-transmitting instruments, at each end of the line, one for positive and the other for negative currents, and a selector at each end of the line, of two single-direction double-current-receiving instruments at each end of the line, one operated only by positive currents, and the other only by negative currents, and each adapted to be changed from, and restored to, normal condition, by alternate current impulses of proper direction in the line, and means for counteracting, at each end of the line, the effect of the outgoing messages upon the receiving instruments located at that end of the line, substantially as described.

7. In a transmitter, the combination, with primary and secondary relays, two local circuits passing through magnet-coils of the primary relay tending to move the armature thereof in different directions, respectively, when energized, and connected to opposite contact-points of the secondary relay, and a generator connected to the armature of the secondary relay, of a circuit-controller adapted to close the circuit of the generator through the one or the other of said local circuits, at will, and means, operated by the primary relay, for reversing the secondary relay when the primary relay is reversed, substantially as described.

8. In a transmitter, the combination, with a primary relay, the rapidity of operation of which is adjustable, a secondary relay, two local circuits passing through magnet-coils of the primary relay tending to move the armature thereof in different directions, respectively, when energized, and connected to opposite contact-points of the secondary relay, and a generator connected to the armature of the secondary relay, of a circuit-controller adapted to close the circuit of the generator through the one or the other of said local circuits, at will, and means, operated by the primary relay, for reversing the secondary relay when the primary relay is reversed, substantially as described.

9. In a transmitter, the combination, with primary and secondary polar relays, two local circuits passing through opposing magnet-coils of the primary relay and connected to opposite contact-points of the secondary relay, and a generator connected to the armature of the secondary relay, of a circuit-controller adapted to close the circuit of the generator through the one or the other of said local circuits, at will, and means, operated by the primary relay, for reversing the secondary relay when the primary relay is reversed, substantially as described.

10. In a telegraph system, the combination, with a line conductor, and a selector adapted to place either of two circuits in a line-circuit, at will, of two double-current transmitters operating selector-circuits which control the selector, each transmitter being arranged to produce in its selector-circuit a current impulse at the beginning and again at the end of each signal of that transmitter, thereby causing the selector to place one of said two circuits controlled thereby in the line, said selector being provided with means for delaying the production of an impulse by one transmitter, when the actuating members of both transmitters are operated simultaneously, until the impulse from the other transmitter is completed, substantially as described.

11. In a telegraph system, the combination, with a line conductor, and a selector adapted to place either of two circuits in a line-circuit, at will, of two transmitters operating selector-circuits which control the selector, said selector being provided with a vibrator through opposing contacts of which the selector-circuits pass, and with magnets and opposing magnet-coils through which the selector-circuits pass, for arresting the operation of the vibrator, whereby, when either selector-circuit is completed, it checks the operation of the vibrator and prevents the completion of the other selector-circuit until the selector-circuit first completed is broken, substantially as described.

12. In a selector, the combination, with a selecting-relay adapted to place either of two circuits in a third circuit at will, of a vibrator, and two controlling-circuits passing through opposing magnet-coils of the selecting-relay, through opposing contacts of the vibrator, and through opposing magnet-coils which, when one of said controlling-circuits is completed, check the operation of the vibrator and prevents the completion of the other controlling-circuit until the controlling-circuit first completed is broken, substantially as described.

13. In a selector, the combination, with a selecting-relay adapted to place either of two circuits in a third circuit, at will, of a vibrator comprising relays and circuits controlled thereby, by which said relays alternately reverse each other, and two controlling-circuits passing through opposing contact-points of one relay of the vibrator, through opposing magnet-coils of that relay exerting a preponderating influence on the armature, and through opposing magnet-coils of the selecting-relay, whereby, when either of said controlling-circuits is completed and energized, it operates the selecting-relay, and prevents the completion of the other controlling-circuit until the controlling-circuit first energized is broken, substantially as described.

14. In a telegraph system, the combination, with two transmitters, each having primary and secondary relays, two local circuits passing through magnet-coils of the primary relay tending to move the armature thereof in different directions, respectively, when energized, and connected to opposite contact-points of the secondary relay, an actuating-circuit controller adapted to connect a selector-circuit with either of said local circuits, and means, operated by the primary relay, for reversing the secondary relay when the primary relay is reversed; of a selector controlling currents of opposite polarity and adapted to place either of said currents to a line at will, and having a vibrator, and selector-circuits, one for each transmitter, connected to the armature of the secondary relay of said transmitter, and to the actuating-circuit controller thereof; said selector-circuits passing through opposing magnet-coils of a controlling-magnet of the selector, and through opposing contact-points of the vibrator and opposing magnet-coils by which the operation of the vibrator is checked when said coils are energized, substantially as described.

15. The combination, with the field-magnets and armature of a polar relay, of means for reversing the relative polarity of the armature and field-magnets when the position of the armature is reversed, substantially as described.

16. The combination, with the field-magnets and armature of a polar relay, of an electromagnet energizing said armature, and means for reversing the relative polarity of said magnet and the field-magnets when the position of the armature is reversed, substantially as described.

17. The combination, with a main polar relay, the armature of which is magnetized by an electromagnet, of a reversing-relay controlling the circuit of said armature-magnet, and adapted to reverse the polarity of said magnet when the position of the armature of said reversing-relay is reversed, and means operated by the armature of said main relay for reversing the position of the armature of said reversing-relay when the armature of said main relay is reversed, substantially as described.

18. The combination, with a main polar relay having field-magnets through which a controlling or primary circuit may pass, the armature of said relay being magnetized by an electromagnet, of a secondary relay the armature of which is mechanically coupled to the armature of the primary relay, a secondary circuit passing through magnet-coils of said secondary relay and through contact-points operated by said connected armatures, and arranged to reverse the secondary circuit when said armatures are reversed in position, said secondary circuit tending to hold said armatures stationary, a tertiary circuit, likewise passing through magnet-coils of said secondary relay and normally opposing said secondary circuit, but exerting a lesser influence upon the connected armatures, and likewise controlling the polarity of the armature-magnet of the main relay, a reversing-relay operated by said secondary circuit when it is reversed, and adapted, when itself reversed, to reverse the tertiary circuit, and means for supplying current to said secondary and tertiary circuits, substantially as described.

In testimony whereof I affix my signature in the presence of two witnesses.

THOMAS B. DIXON.

Witnesses:
H. M. MARBLE,
H. A. CASE.